United States Patent [19]

Buss

[11] 4,004,086

[45] Jan. 18, 1977

[54] APPARATUS FOR THE TELEVISION RECONNOITERING OF TERRAIN FROM THE AIR

[75] Inventor: Karl-Bernd Buss, Nuremberg, Germany

[73] Assignee: GRUNDIG E.M.V. Elektro-Mechanische Versuchsanstalt Max Grundig, Fuerth, Germany

[22] Filed: Mar. 28, 1975

[21] Appl. No.: 562,818

[30] Foreign Application Priority Data

July 6, 1974 Germany ............................ 2432448

[52] U.S. Cl. ........................ 358/109; 178/DIG. 20; 358/206; 358/225
[51] Int. Cl.² ...................... H04N 3/16; H04N 3/00
[58] Field of Search ............ 178/7.1, DIG. 20, 6.7, 178/6.8, 7.6, DIG. 40, 7.2

[56] References Cited

UNITED STATES PATENTS

| | | | |
|---|---|---|---|
| 2,931,858 | 4/1960 | Hammond, Jr. et al. | 178/6.7 R |
| 3,554,628 | 1/1971 | Kennedy | 178/7.6 X |
| 3,717,772 | 2/1973 | Engman | 178/7.6 X |

FOREIGN PATENTS OR APPLICATIONS 1,358,036   6/1974   United Kingdom ............ 178/6.7 R

*Primary Examiner*—John C. Martin
*Assistant Examiner*—Aristotelis M. Psitos

[57] ABSTRACT

An apparatus for reconnoitering terrain from a moving aircraft is provided. The apparatus comprises a mirror arrangement perpendicular to the object plane of the terrain under observation and means for the stepwise tilting of the mirror about an axis perpendicular to the terrain. The apparatus further includes a television camera having an optic axis directed at the mirror and inclined at an angle with respect to the terrain. Means interconnect the camera and tilting means to activate the camera only when the mirror is stopped in a position.

3 Claims, 3 Drawing Figures

APPARATUS FOR THE TELEVISION RECONNOITERING OF TERRAIN FROM THE AIR

BACKGROUND OF THE INVENTION

The present invention relates to an apparatus for reconnoitering terrain from an aircraft and more particularly to a system utilizing a television camera for such reconnoitering.

A disadvantage of televised aerial reconnaissance is that the strip of ground that can be covered by a television camera is very narrow. This results from the narrow resolving power of video cameras. In British Pat. No. 1,358,036 an apparatus is disclosed whereby the width of the strip of ground that can be reconnoitered by a television camera is broadened by linearly arranging a number of individual images into an image line. Individual images are obtained by tilting a mirror about the optic axis of the television camera or televising the images. While this system does broaden the scanned strip, it produces several problems.

The most significant problem is that a different scale results for each of the individual images of the line since the angle of incidence i.e., the angle of the viewing direction with respect to the horizontal, changes from image to image. Another problem with the prior art system is that the distortion of individual images differs along the image line so that later evaluation of the total images poses difficulties.

In view of the above, the principal object of the present invention is to provide an apparatus for reconnoitering terrain from the air wherein the scale of size of all the individual images and the distortion within each individual image remains constant.

SUMMARY OF THE INVENTION

The above and other beneficial objects and advantages are attained in accordance with the present invention by providing an apparatus for reconnoitering terrain from a moving aircraft. The apparatus comprises a mirror arrangement perpendicular to the plane of the terrain under observation and means for the stepwise tilting of the mirror about an axis perpendicular to the terrain. The apparatus further includes a television camera having an optic axis directed at the mirror and inclined at an angle with respect to the terrain. Means interconnect the camera and tilting means to activate the camera only when the mirror is stopped in a position.

DETAILED DESCRIPTION OF THE PREFERRED EMBODIMENT

Figure 1:
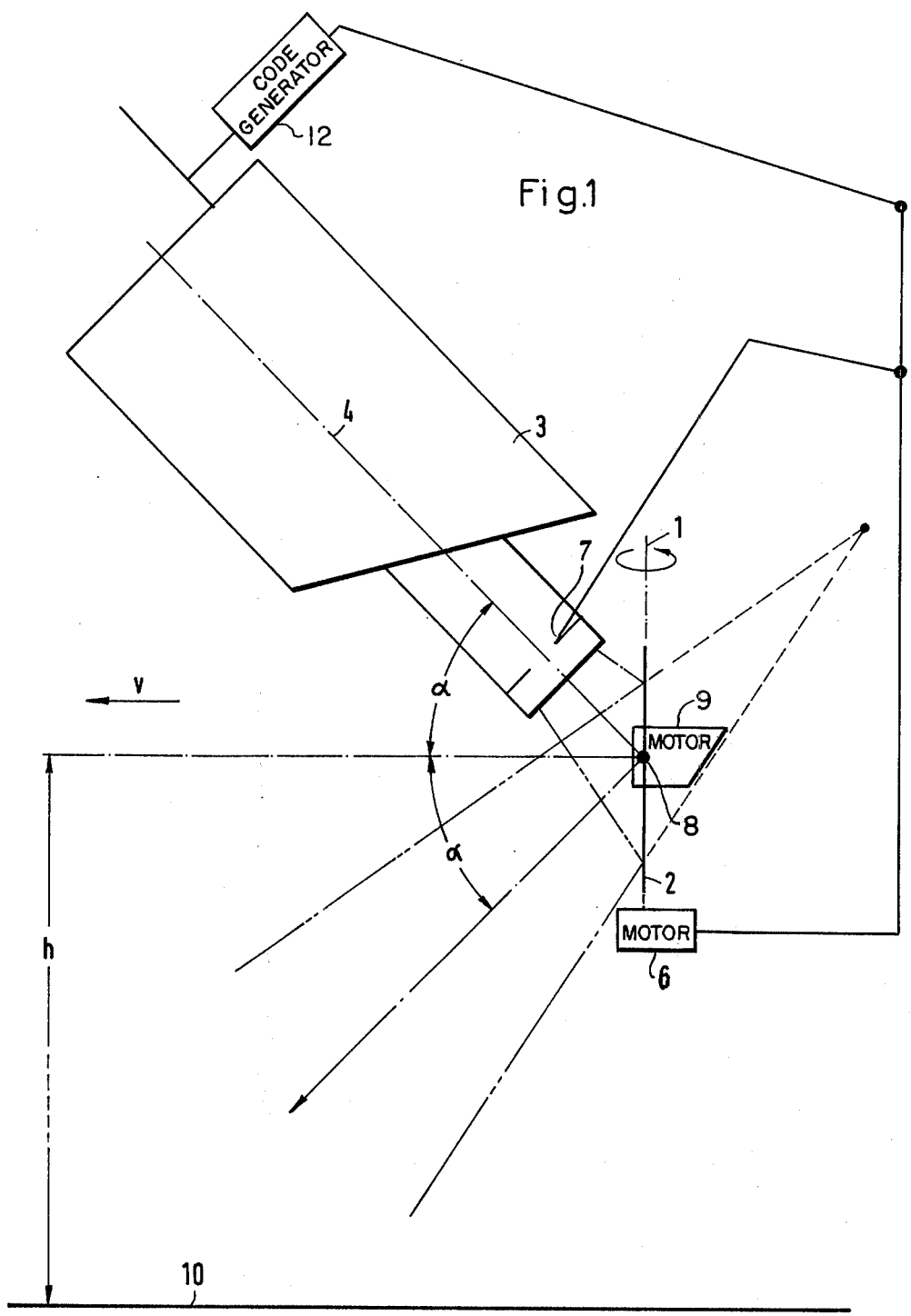
FIG. 1 is a diagrammatic representation of an apparatus in accordance with the present invention.

Reference is now made to FIG. 1 of the drawings wherein an apparatus in accordance with the present invention is depicted diagrammatically. As can be seen in FIG. 1, a mirror 2 is arranged in the optical path of a video camera 3. The mirror is positioned for rotation about axis 1 which is nominally perpendicular to the object plane 10 of the terrain under observation. The optic axis 4 of camera 3 is inclined by angle $\alpha$ with respect to the horizontal. The apparatus is contained within an aircraft (not shown) which moves with a velocity V in the direction indicated by the arrow at a height H above the terrain.

Mirror 2 is tilted stepwise about axis 1 by a stepping motor 6. The motor 6 is also connected to a shutter 7 positioned in the television camera so that during periods of actual rotation of the mirror, the shutter is closed so that the camera is inactivated. That is, the camera only televises when the mirror 2 is stationary between steps.

Figure 2:
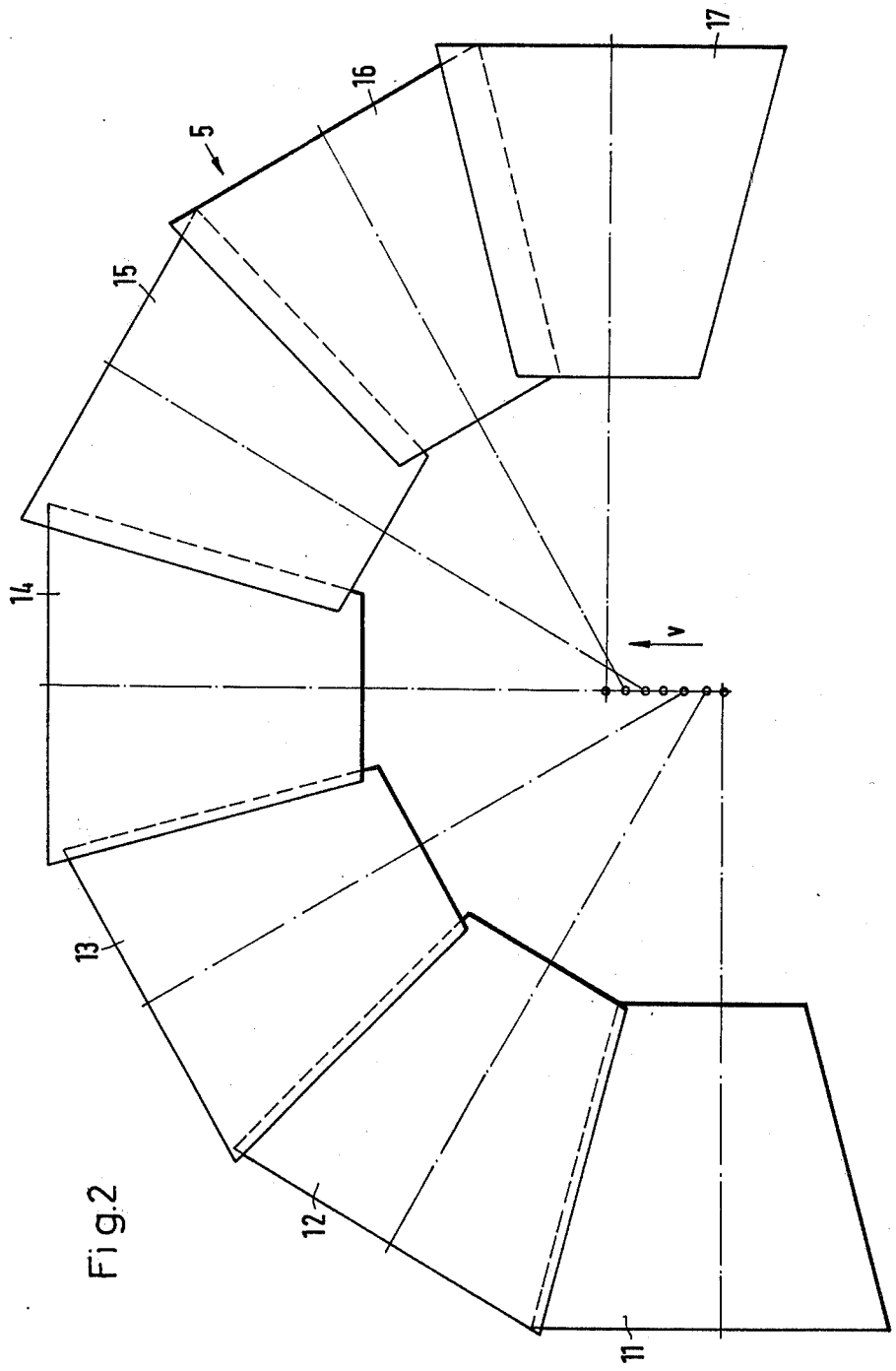
FIG. 2 is a diagrammatic representation of an image line obtained in accordance with the present invention; and, FIG. 3 is a diagrammatic representation of a number of image lines positioned to produce a reconnoitered strip of land significantly broader than the strip available with a conventional television camera.

By tilting the mirror 2 stepwise about axis 1, a number of individual images 11 through 17 are televised. As shown in FIG. 2, the images overlap slightly and together describe essentially a semicircular ring or image line 5. It should be appreciated, however, that due to the forward velocity of the aircraft, line 5 will not actually be semicircular in shape but, for purposes of the present explanation, may be considered semicircular.

In order to compensate for blurring of the image which results from the aircraft's motion and to improve the image sharpness, the mirror 2 is also adapted to be tilted about axis 8 (into and out of the plane of the paper in FIG. 1) which is parallel to the plane 10 of the terrain and perpendicular to the direction of the aircraft. Rotation about axis 8 is controlled by motor 9.

Figure 3:
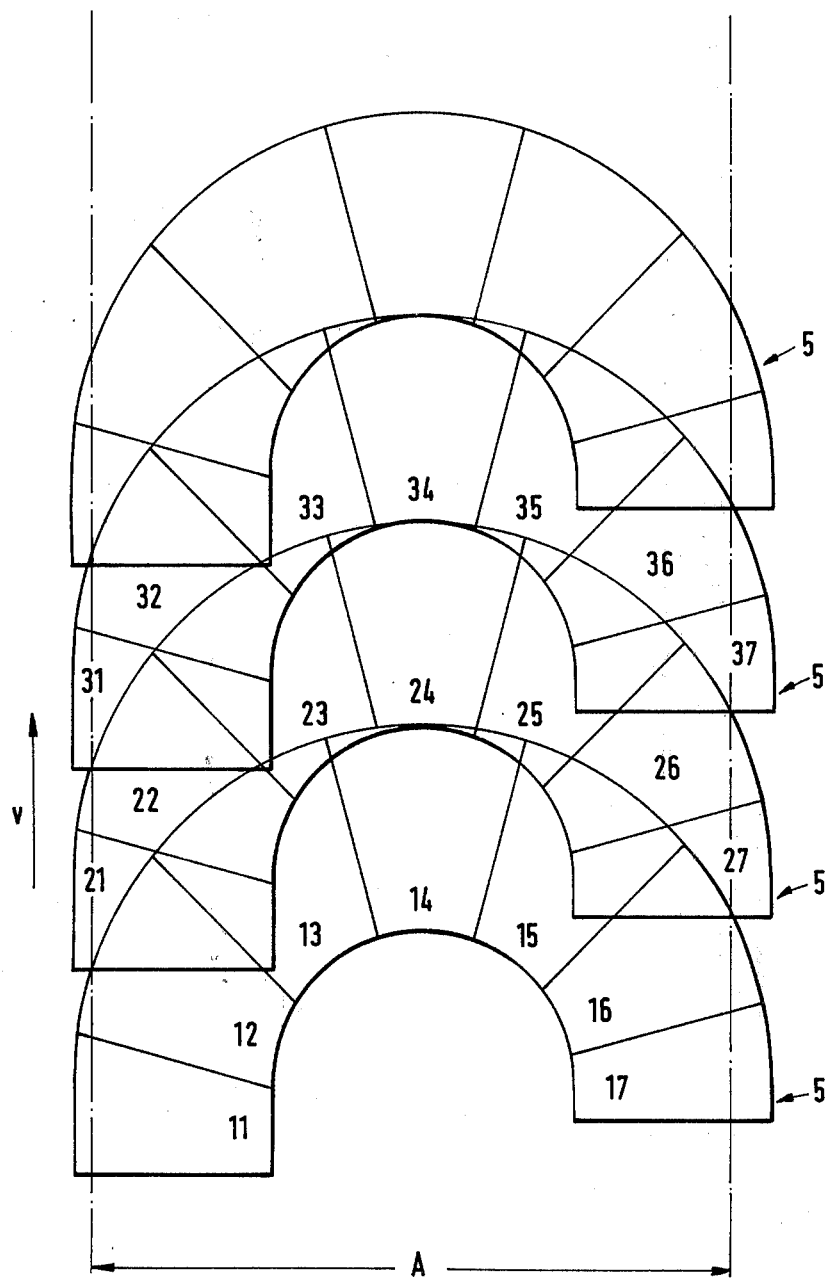

By scanning several sequential image lines 5, each made up of individual images 11 through 17, 21 through 27 and 31 through 37 as shown in FIG. 3, it is possible to obtain a scan of a terrain strip the width A of which is considerably wider than the width of a strip scanned with a conventional television camera. In order to insure that each of the individual images is properly positioned in the final composite as shown in FIG. 3, a code generator 12 is utilized. This generator takes into account the tilt position of the mirror and applies a suitable signal to the output of the camera 3 along with the image. The details and operation of the code generator are discussed in the aforementioned British patent specification.

Thus, in accordance with the above, the aforementioned objects are effectively attained.

Having thus described the invention, what is claimed is:

1. An apparatus for reconnoitering terrain from a moving aircraft flying parallel to the terrain under observation comprising: a mirror arranged nominally perpendicular to the object plane of the terrain under observation; means for stepwise tilting said mirror about an axis perpendicular to said object plane, whereby to define an arc by a series of steps, a television camera having an optic axis directed at said mirror, said optic axis being inclined at an angle and with respect to said object plane, and means interconnecting said camera and tilting means to actuate said camera only when said mirror is in position between steps.

2. The apparatus in accordance with claim 1 further comprising a shutter on said video camera connected to said interconnecting means whereby said shutter is opened only while said mirror is at rest between steps.

3. The apparatus in accordance with claim 1 wherein said mirror is further arranged to tilt about a second axis to compensate for blurring resulting from the aircraft's motion, said second axis being perpendicular to the path of motion of said aircraft and parallel to the object plane of said terrain and further comprising means for tilting said mirror about said second axis.

* * * * *